W. E. NICKERSON.
APPARATUS FOR TESTING THE DURABILITY OF CUTTING EDGES.
APPLICATION FILED NOV. 8, 1907.
1,108,928.
Patented Sept. 1, 1914.
3 SHEETS—SHEET 1.
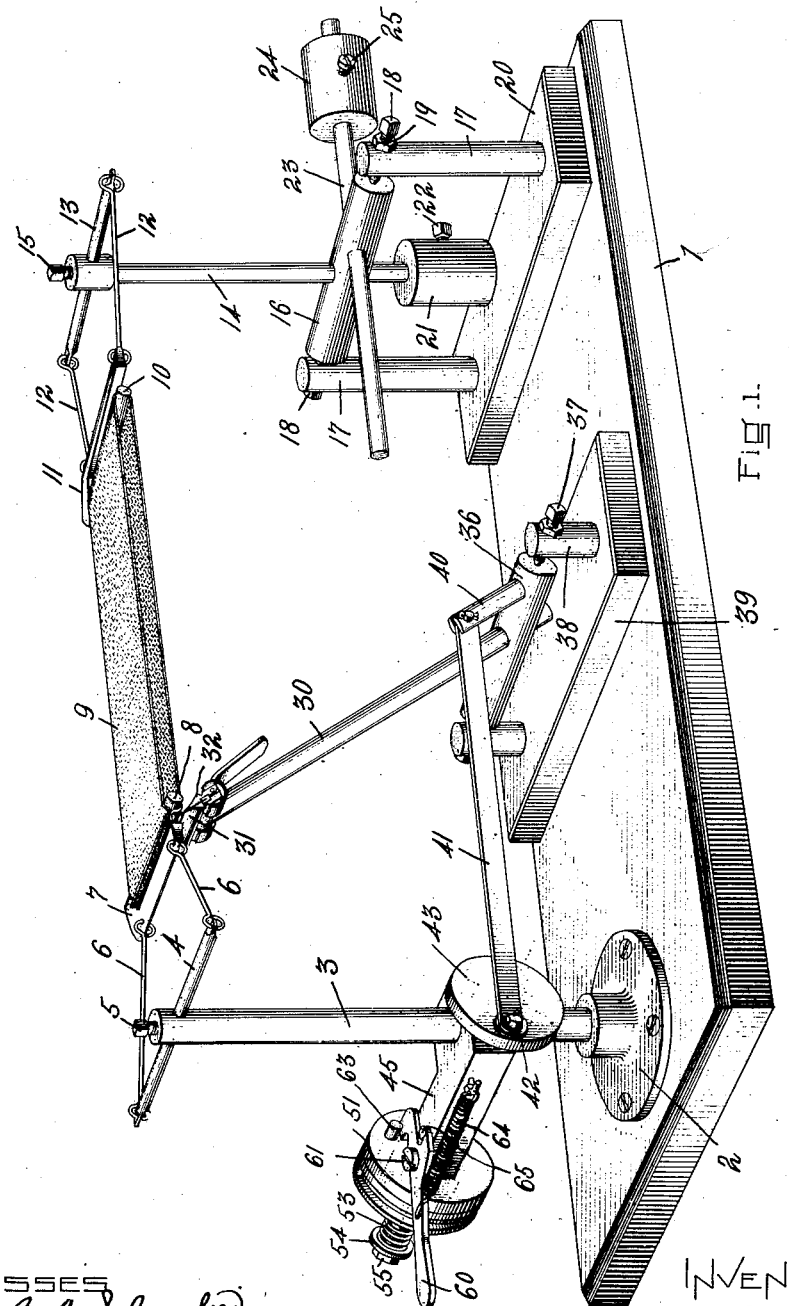

W. E. NICKERSON.
APPARATUS FOR TESTING THE DURABILITY OF CUTTING EDGES.
APPLICATION FILED NOV. 8, 1907.
1,108,928.
Patented Sept. 1, 1914.
3 SHEETS—SHEET 2.
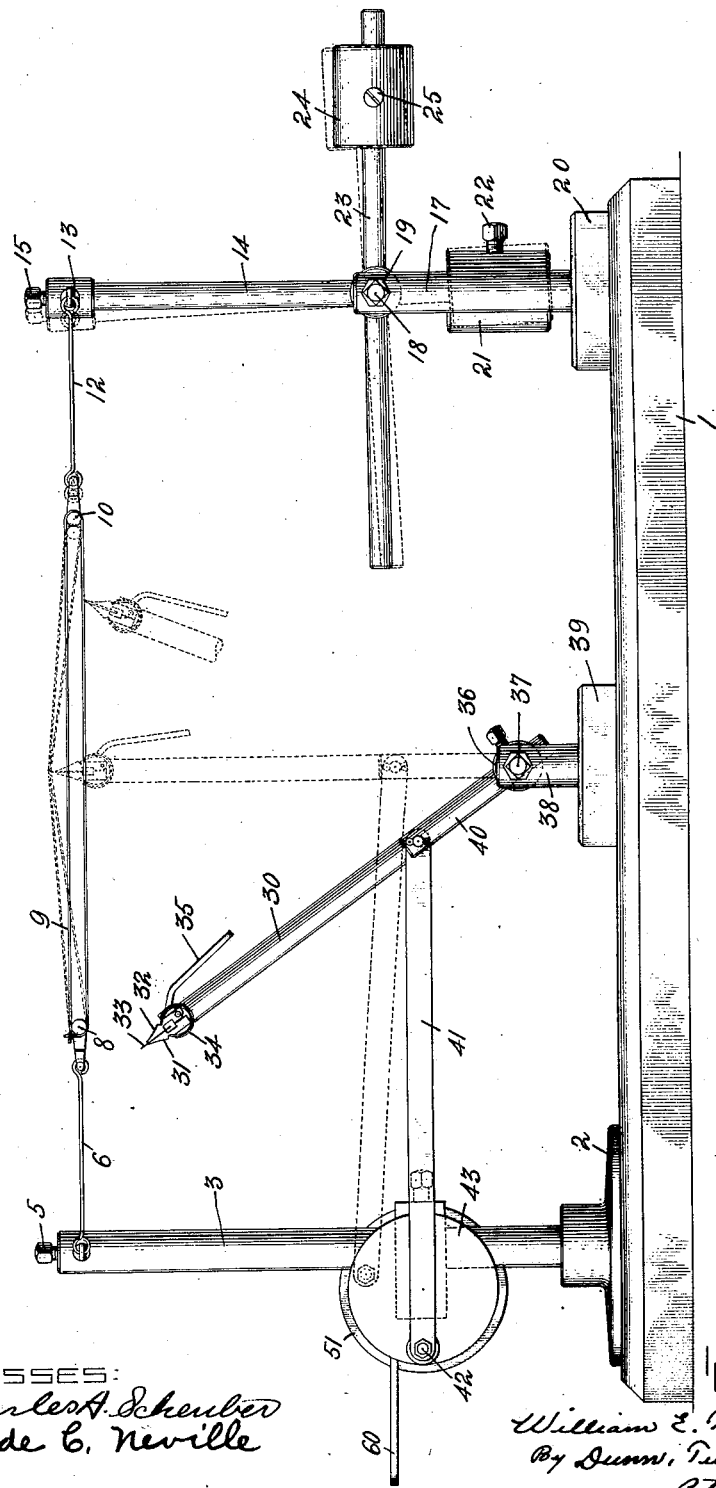

W. E. NICKERSON.
APPARATUS FOR TESTING THE DURABILITY OF CUTTING EDGES.
APPLICATION FILED NOV. 8, 1907.
1,108,928.
Patented Sept. 1, 1914.
3 SHEETS—SHEET 3.
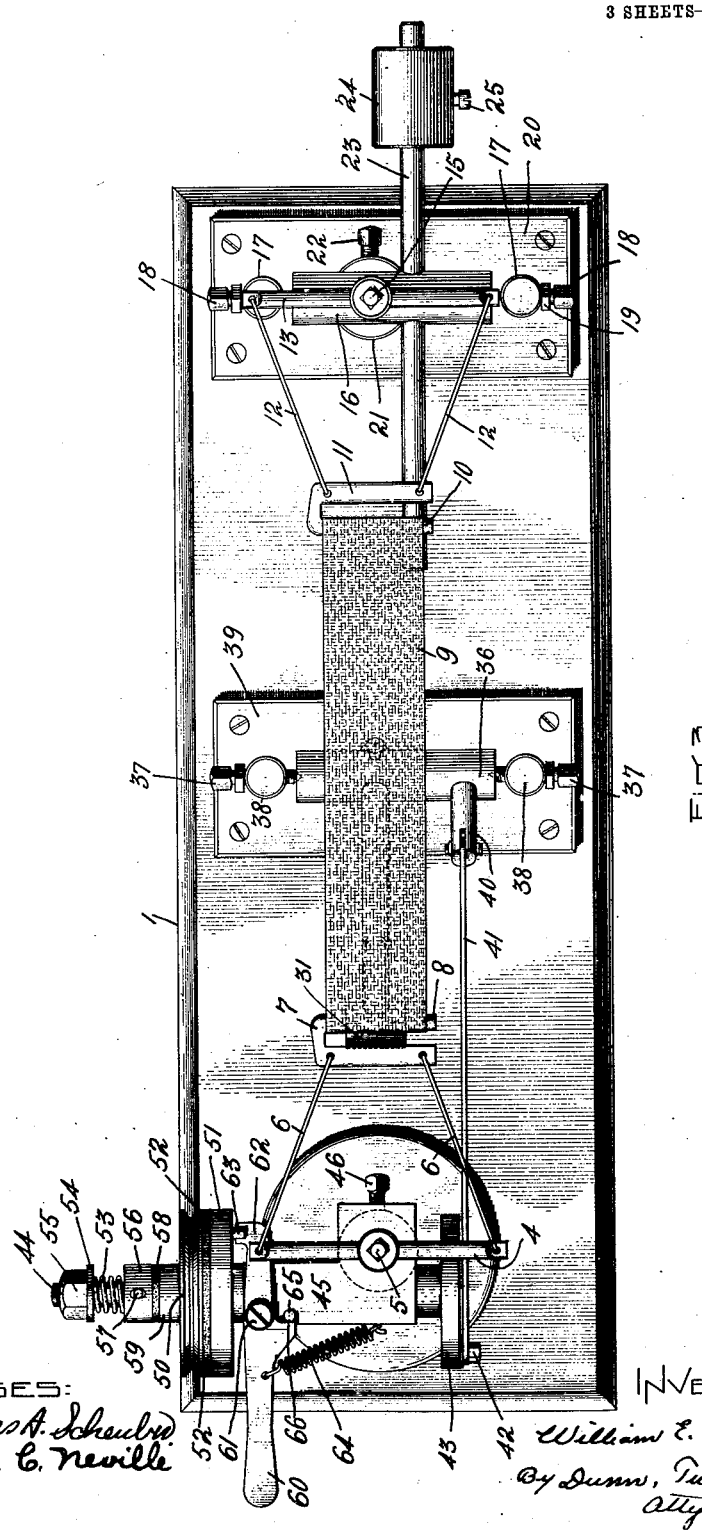

UNITED STATES PATENT OFFICE.

WILLIAM E. NICKERSON, OF CAMBRIDGE, MASSACHUSETTS.

APPARATUS FOR TESTING THE DURABILITY OF CUTTING EDGES.

1,108,928. Specification of Letters Patent. Patented Sept. 1, 1914.

Application filed November 8, 1907. Serial No. 401,256.

*To all whom it may concern:*

Be it known that I, WILLIAM E. NICKERSON, of the city of Cambridge, county of Middlesex, and Commonwealth of Massachusetts, have invented certain new and useful Improvements in Apparatus for Testing the Durability of Cutting Edges, of which the following is a full, clear, and exact specification.

This invention relates to a process and apparatus for testing the durability of cutting edges, and while the present invention may be used for testing the durability of cutting edges of various types of tools and cutlery, it is particularly intended for testing the cutting edges of thin razor blades.

Heretofore one difficulty attending the manufacture of razor blades and other high-class cutting implements has been the inability to obtain accurate knowledge as to the durability of the blade after its manufacture. This difficulty has been particularly felt since the introduction upon the market of thin, or so-called wafer or paper blades, which are designed to be used until dull and then thrown away. With these thin blades it frequently happens that while responding fully to a test for sharpness such, for instance, as the well known hair test, wherein the blade is caused to cut a strand of hair, after usage once or twice the blades break down and become dull and useless.

With the foregoing premises in view, the principal object of the invention is to test a cutting edge in such a manner as to determine its durability, tenacity, or power of retaining its sharpness throughout a number of shaves or other operations.

With the foregoing and other objects in view which will appear as the description proceeds, the invention resides in the process and apparatus defined in and by the following claims.

One convenient course of procedure and apparatus for carrying the process into effect is illustrated and described herein for the purpose of conveying a clear understanding of the invention, but it is to be distinctly understood that changes in the precise embodiment of invention herein disclosed can be made within the scope of the claims without departing from the spirit of the invention.

In the accompanying drawings forming part of this specification: Figure 1 is a perspective view of an apparatus suitable for carrying the process of the present invention into effect. Fig. 2 is a side elevation thereof. Fig. 3 is a plan view of the apparatus.

Like reference numerals indicate corresponding parts in the different figures of the drawing.

The reference numeral 1 indicates a support which may be of any suitable form and construction. Secured to the support 1 in any desired manner is a base plate 2 with which is connected a standard or upright 3. Extending through the upper end of the standard 3 is a cross-piece 4 which is held against longitudinal displacement by means such as the set screw 5. Connected with the ends of the cross-piece 4 are wires or links 6. The wires 6 are connected with an approximately U-shaped yoke 7 having a cylindrical portion 8 on which is mounted one end of an endless belt or abrading surface or dulling element 9. The abrading surface or dulling element 9 may be of any suitable material, although I prefer to use any ordinary fabric, such for example as cotton drilling. The end of the abrading surface 9 opposite the yoke 7 is suitably supported upon the cylindrical portion 10 of another yoke 11. By reason of the fact that the yokes 7 and 11 are approximately U-shaped, as shown particularly in Fig. 3, it will be apparent that the abrading surface 9 can be readily slipped sidewise off the cylindrical portions 8 and 10 and that a new abrading surface can be substituted whenever the previous one becomes worn. The yoke 11 is connected by means such as the wires 12 with a cross-piece 13 extending through the upper end of an arm 14 and held against longitudinal movement by means such as the set screw 15. The arm 14 extends through, and is rigidly connected with a shaft or fulcrum 16 which is supported for rotation between a pair of standards 17 by means such as the adjusting screws 18 having pointed inner ends to fit into fulcrum 16, lock-nuts 19 being provided to hold the adjusting screws 18 in proper position. The standards 17 are suitably supported upon a base plate 20 mounted on the support 1. The arm 14 at its lower end may be provided with a weight 21 which is held in position by means such as set screw 22. Extending through the shaft 16 at approximate right angles to the arm 14 is an arm 23 which is provided at its outer end with a weight 24 capable of being adjusted to any desired position on the arm 23 and being held in adjusted position by means such as the set screw 25. The gravity action of the weight 24 serves to hold the abrading surface 9 under suitable tension, as will be readily understood and this tension can be properly adjusted by moving the weight 24 to the desired position upon the arm 23. The inner end of the arm 23, that is the end opposite the weight 24, can be used as a handle for raising the weight 24 and releasing the tension upon the abrading surface 9 when it is desired to substitute a new abrading surface.
The present invention contemplates the employment of suitable means for holding the cutting edge to be tested in suitable contact with the abrading surface 9 and for producing a plurality of relative and uniform movements between the cutting edge and the abrading surface while they are in contact with each other, whereby the abrading surface by its contact with the cutting edge will progressively dull the same and thus determine the tenacity or the endurance of said cutting edge under wear.

One convenient means of holding the cutting edge in proper relation to the abrading surface, although not the only means which can be used for this purpose, will now be described. The reference numeral 30 indicates a reciprocating element. Mounted rigidly in any suitable manner upon the upper end of the reciprocating element 30 is a blade holding clamp which, while it may be of any suitable form and construction, preferably consists of a pair of clamping jaws 31 and 32 adapted to clamp between them the blade 33 the cutting edge of which is to be tested. The clamping jaws 31 and 32 are pressed yieldingly together by means such as the circular spring 34 and said jaws are released or opened by means of the handle 35 for the purpose of inserting the blade. The reciprocating element or arm 30 is rigidly mounted upon a shaft or fulcrum member 36 which is supported at its ends by adjusting screws 37 mounted in posts or uprights 38 connected with the base plate 39. Rigidly connected in any suitable manner with the fulcrum member 36 is a crank-arm 40 with which is connected a link 41. The link 41 at its opposite end is eccentrically connected at 42 with a disk 43.

The disk 43 is rigidly mounted upon one end of a shaft 44 which is suitably journaled in a block 45 mounted upon the standard 3 and held rigidly thereon by means such as the set screw 46. The means for operating the shaft 44 and reciprocating member 30 will now be described. This means preferably includes a belt wheel 50 which is loosely mounted upon the shaft 44 and is to be continuously driven in any suitable manner. Arranged at one side of the belt wheel 50 is a friction disk 51 which is fixed or rigidly mounted upon the shaft 44 in any suitable manner. Friction material 52 is interposed between the belt wheel 50 and the fixed disk 51. For the purpose of yieldingly pressing the belt wheel 50 toward the fixed disk 51, a spring 53 is employed. This spring 53 is held at its outer end by means such as the washer 54 and nut 55. At its inner end the spring 53 presses against a collar 56 which is splined or keyed upon the shaft 44 in any suitable manner as indicated at 57. Friction material 58 is interposed between the collar 56 and the hub 59 of the belt wheel 50. The spring 53 and collar 56 serve to press the belt wheel 50 into frictional contact with the fixed disk 51 as will be apparent.

For the purpose of imparting to the shaft 44 one complete revolution and of then stopping said shaft, a releasing device 60 is employed. This releasing device 60 is preferably in the form of a lever which is fulcrumed at 61 upon the block 45 and is provided with a head 62 adapted to lie in the path of movement of a pin 63 set into the disk 51. The head 62 is held in the path of the pin 63 by means such as the spring 64 which is connected at one end with the lever or releasing device 60 and at its other end with the block 45. The movements of the releasing device 60 toward the disk 51 is limited by the pin or stop 65 set into the block 45 in the path of a shoulder 66 upon the lever 60.

When the apparatus is in operation, the 11 operator places a blade in the blade holding clamp on the reciprocating element 30. By then throwing over the releasing device 60 the shaft 44 is given one complete revolution at the end of which it stops. This single 11 revolution of the shaft 44, through the disk 43 and link 41 moves the reciprocating member 30 forward and backward once as indicated by the dotted lines in Fig. 2. The cutting edge of the blade, therefore, while 12 held in dulling contact with the abrading surface 9 is moved forward and backward along said abrading surface. It will be apparent that the wear occasioned by this contact between the abrading surface and 1: the cutting edge will fall directly upon the cutting edge and will have a dulling effect thereon. At the end of this first operation the blade may be removed from the blade clamp and its sharpness tested, for example, by cutting a hair. If the blade is still sharp it is replaced in the blade clamp on the arm 30, the releasing device 60 is operated and the blade is given a second forward and backward dulling movement against the abrading surface. The blade may then again be removed and tested by means of a hair or any other suitable manner. This operation of wiping the cutting edge backward and forward in dulling contact with the abrading surface is repeated until the blade is no longer able to meet the requirements of the cutting or other test, it being understood that the blade is generally tested as to its cutting qualities at the end of each forward and backward movement of the arm 30 or at appropriate intervals. In this way the durability or tenacity of the cutting edge can be effectively determined. By counting the number of dulling actions which a blade can stand before becoming too dull for use, a blade from one batch of steel can be compared with a blade from another batch of steel. It will be observed that the reciprocating arm 30 has a uniform path of movement for which reason the successive dulling actions are uniform or equal. By testing the blade therefore at the end of each uniform dulling movement the exact point at which its cutting edge becomes wholly broken down and refuses to cut can be readily determined. If the cutting edge were subjected to a prolonged dulling action or to a number of successive dulling actions without testing it at appropriate intervals, the exact point at which the cutting edge wholly refused to cut could not be accurately determined.

It will be observed from the foregoing that the present invention contemplates a method of testing cutting edges which consists, briefly speaking and generally, in subjecting the cutting edge to a plurality of uniform dulling actions and testing the sharpness of the cutting edge at appropriate intervals.

While the apparatus herein disclosed is particularly adapted for carrying out the process in a convenient manner, it will be understood that the process nevertheless can be carried out by other forms of machines or could even be carried out by hand, although this latter method would naturally be slower than the machine method.

It will be understood that in carrying out the process, a small number of blades will usually be taken from each batch of steel and will be tested in the manner described. The tenacity or durability of different blades taken from the same batch of steel will vary more or less, but after testing a sufficient number of cutting edges, the average durability of the whole batch can be readily calculated. The average of one batch of steel can then be compared with the average of the other batches for the purpose of determining the hardening and tempering processes which produce the most durable cutting edges.

In conclusion it must be borne in mind that it is highly desirable that the abrading or dulling action shall fall directly upon the cutting edge; that the successive dulling actions shall be uniform; and that the blade shall be tested at suitable intervals between and after the dulling actions in order to determine accurately the point at which the cutting edge breaks down.

It will be understood that the blades which have been dulled in the manner herein described, to determine their tenacity or durability can be subsequently resharpened for use, if desired. It is to be understood further that it is not necessary to test the sharpness of the cutting edges at the end of each dulling operation, for where a cutting edge stands up well, it may be dulled a plurality of times before testing its sharpness.

In conclusion, it will be understood that after the cutting edge is subjected to different dulling actions, it is desirable to measure, gage, or determine the effect of such dulling actions, or in other words, to determine the degree of dullness which has been imparted to the cutting edge, and the hair test is merely one means of gaging, measuring or determining the effect of the dulling action. Incidentally, this hair or other cutting test, indicates the cutting capacity of the cutting edge at different stages of dullness, but it is not essential that the hair test be used as any other test can be employed which will gage, measure or indicate the effect of the dulling operation upon the cutting edge.

What is claimed is:

1. An apparatus for testing razor blades comprising means for supporting an abrading surface, means for holding the cutting edge of the razor blade at approximately right angles to said abrading surface and in contact therewith and means for producing uniform relative dulling movements between said abrading surface and the cutting edge of the blade.

2. An apparatus for testing razor blades comprising a yieldingly supported abrading surface, means for holding the cutting edge of the razor blade in contact with said abrading surface at approximate right angles thereto and means for producing uniform relative reciprocatory movement between said abrading surface and said cutting edge while in contact one with the other.

3. An apparatus for testing the durability of cutting edges, comprising a support, a dulling element in the form of an endless belt removably mounted upon said support, counterbalance means for holding said dulling element under suitable tension, a reciprocating element having means for holding a cutting edge in scraping relation to said dulling element, a driving wheel for operating said reciprocating element, and automatic means for stopping said reciprocating element at the end of each forward and backward movement thereof, substantially as described.

In testimony whereof, I have hereunto set my hand in the presence of two subscribing witnesses.

WILLIAM E. NICKERSON.

Witnesses:
AIME CASTEELS,
ADOLPH C. KAISER.